United States Patent [19]

Sato et al.

[11] Patent Number: 5,766,291
[45] Date of Patent: Jun. 16, 1998

[54] METHOD FOR PRODUCING HEAT-RESISTANT SYNTHETIC QUARTZ GLASS

[75] Inventors: Tatsuhiro Sato, Takefu; Akira Fujinoki, Koriyama, both of Japan

[73] Assignee: Heraeus Quarzglas GmbH, Hanau, Germany

[21] Appl. No.: 731,595

[22] Filed: Oct. 16, 1996

[51] Int. Cl.$^6$ .............. C03B 19/01; C03B 19/09; C03B 37/00; C03C 15/00

[52] U.S. Cl. .............. 65/17.3; 65/17.6; 65/30.1; 65/63; 65/64; 65/111; 65/424; 65/474

[58] Field of Search .............. 65/17.3, 17.6, 65/30.1, 32.1, 63, 64, 102, 104, 111, 424, 474, DIG. 8

[56] References Cited

U.S. PATENT DOCUMENTS

| | | | |
|---|---|---|---|
| 3,113,008 | 12/1963 | Elmer | 65/31 |
| 4,414,014 | 11/1983 | Bruning et al. | 65/31 |
| 4,938,788 | 7/1990 | Segawa et al. | 65/18.1 |
| 4,961,767 | 10/1990 | Schermerhorn et al. | 65/2 |
| 5,045,508 | 9/1991 | Brow et al. | 501/48 |
| 5,126,081 | 6/1992 | Willingham et al. | 264/1.2 |
| 5,410,428 | 4/1995 | Yamagata et al. | 359/350 |

FOREIGN PATENT DOCUMENTS

| | | |
|---|---|---|
| 4-59633 | 2/1992 | Japan. |
| 05279049 | 10/1993 | Japan. |
| 07033447 | 2/1995 | Japan. |

Primary Examiner—Donald E. Czaja
Assistant Examiner—Jacqueline A. Ruller
Attorney, Agent, or Firm—Felfe & Lynch

[57] ABSTRACT

A porous silica body with a density of 0.1 g/cm$^3$ to 0.5 g/cm$^3$ and a density variation of less than 30% is subjected to a first heat-treatment in an ammonia-containing atmosphere, a second heat-sintering in non-oxidizing atmosphere, and further heat-treatment at a temperature in the range of 1400° C. to 2000° C. under an increased pressure of 500 kg/cm$^2$ or more in a non-oxidizing atmosphere.

3 Claims, No Drawings

METHOD FOR PRODUCING HEAT-RESISTANT SYNTHETIC QUARTZ GLASS

BACKGROUND OF THE INVENTION

The present invention relates to a method of producing heat-resistant synthetic quartz glass used as material for a high-purity heat-resistant structural member or as material for a quartz glass substrate of a thin-film transistor using polycrystalline silicon.

Quartz glass has conventionally been used as material for a furnace tube in fabrication of semiconductor devices such as LSI (process tubes or liner tubes), wafer boats, and other jigs, since it is highly pure and does not change its characteristics or shape even at temperatures as high as about 1000° C. in heat-treatment. In recent years, the heat-treatment for LSI has been conducted at about 1200° C., and therefore high-purity silicon carbide heat-resistant material has been used in place of quartz glass, which is subject to viscosity deformation. The silicon carbide heat-resistant material unavoidably includes a trace of impurities from the method of producing it, and the impurities present a contamination problem in fabrication of super LSI with a large packing density of elements. In view of the problem, quartz glass, which is easier to purify, has been reevaluated to improve the heat-resistance.

Unexamined patent application no. Sho 63-236722 discloses a method of producing highly heat-resistant quartz glass. In the method, elements of impurities that become nuclei inducing cristobalitization are introduced into the surface of the quartz glass, thus conferring it with not only high heat-resistance but also a barrier to stop the impurities from intrusion, since a cristobalite layer is formed in the surface region. When this quartz glass is long used, however, the region occupied by a cristobalite layer grows, so that the quartz glass becomes brittle and apt to flake or crack.

In order to address this problem, nitrogen atoms have been introduced into quartz glass to substitute stronger Si—N bonds for Si—O bonds. This method comprises a step of heat-treating a porous silica body made of silicon dioxide synthesized by vapor phase synthesis methods such as VAD (Vapor-Phase Axial Deposition), OVD (Outside Vapor Deposition), MCVD (Modified Chemical Vapor Deposition) at a temperature at which densifying by sintering does not occur (1200° C. or lower) in a furnace filled with an ammonia-containing atmosphere. In a further step, the body is sintered by heating at a temperature higher than the afore-mentioned temperature so as to obtain dense nitrogen-doped quartz glass. In order to improve the heat-resistance of the quartz glass produced by these methods, the viscosity (log) at 1280° C. should be 12.5 dPas or more where the viscosity (log) at 1280° C. is an index for heat-resistance and the 12.5 dPas or more is of the natural quartz glass produced by electric fusion. This viscosity is achieved by high doping. However, nitrogen gas and hydrogen gas arise in the silica porous body thus highly doped with nitrogen by decomposition during sintering, and the released gases form bubbles which reduce density.

SUMMARY OF THE INVENTION

According to the invention, a dense and highly heat-resistant synthetic quartz glass can be produced by sintering a nitrogen-doped silica porous body in a non-oxidizing atmosphere and further heating the sintered porous body at a high temperature under an increased pressure (hereafter referred to as HIP treatment).

The method produces high-purity synthetic quartz glass having a viscosity (log) of 12.5 dPas or more at 1280° C.

DETAILED DESCRIPTION OF THE PREFERRED EMBODIMENTS

After a porous silica body is heated in an ammonia containing atmosphere, it is sintered by heating in a non-oxidizing atmosphere and then further heated at a temperature in the range of 1400° C. to 2000° C. under a pressure of 500 kg/cm² or more in a non-oxidizing atmosphere.

In methods developed and put into practical use for the purpose of producing optical fibers such as MCVD method, OVD method, and VAD method, a silicon chloride such as silicon tetrachloride is vaporized, the vapor is subjected to hydrolysis in an oxidizing atmosphere such as a flame, the silica fine particles thus produced are piled up to a loose body, and finally it is sintered by heating to be transformed to an extremely high-purity amorphous silica porous body (hereafter referred to as synthetic quartz glass base material).

When the above-mentioned synthetic quartz glass base material is heat-treated in an ammonia-containing atmosphere, some of the oxygen atoms (O) in the $SiO_2$ network are replaced by nitrogen-atoms (N) and as a result N is doped in the quartz glass base material. In this doping treatment N is fixed through the following reaction taking place:

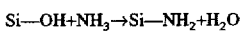

$$Si-OH+NH_3 \rightarrow Si-NH_2+H_2O$$

Through the above-mentioned treatment nitrogen can be doped at a concentration in the range of 2000 ppm to 20000 ppm. As a gas containing ammonia used in the treatment, for example, ammonia gas itself or its mixtures with an inert gas such as nitrogen, helium or argon are named. Ammonia is most suitable as a doping agent, because it is readily available in a state of high-purity and $H_2$ and $H_2O$ which are products of decomposition are removed from the reaction system with ease. Nitrogen gas can also be considered a candidate for the doping agent, but is rather not suitable due to difficulty in replacement for oxygen.

The nitrogen-doped synthetic quartz glass base material is then sintered by heating and in this step the $NH_2$ fixed as described above is separated free as $N_2$ or $H_2$. These gases remain inside closed bubbles formed in the course of sintering to disturb densifying of quartz glass by thermal expansion. The separation of nitrogen vigorously takes place at a temperature of sintering 1200° C. or more, but if the base material is heated up to 1700° C., which is the temperature at which densifying starts, at a rate of 200° C./h or less, before micro-pores of the base material are closed, decomposition gases migrate out of the bulk of the base material and as a result generation of bubbles is prevented. In the course of sintering, if parts with high densities are present inside the bulk of the base material, a gas of $N_2$ or $H_2$, which is trying to migrate, encounters an obstacle against migration, is thus confined inside, and expands during heating at a temperature of sintering to become bubbles. For that reason, it is important that a density of the synthetic quartz glass base material should be set in the range of 0.1 g/cm³ to 0.5 g/cm³ and the variation in density in the range of less than 30%. A porous body cannot hold its original shape with density lower than the lower limit and On the other hand nitrogen doping to the porous body becomes difficult with density higher than the higher limit. When the variation of density falls outside the limiting range of less than 30%, distribution of nitrogen becomes uneven in the bulk and thus improvement on heat-resistance is not realized. The atmosphere is regulated preferably under a reduced pressure, in particular at a vacuum degree of 13 Pa or less, in the heat-sintering step. Under the above indicated conditions, a synthetic quartz glass is produced that does practically not contain any bubbles and is densified. However, bubble generation has often occurred in the bulk of the synthetic quartz glass produced by the above mentioned process during a further heat-treatment at a temperature in the operational temperature range.

When, following the above-mentioned heat-treatment, a HIP treatment was conducted under conditions of a pressure in the range of 500 kg/cm$^2$ or more, preferably between 1000 kg/cm$^2$ and 2000 kg/cm$^2$, and a temperature in the range of 1400° C. to 2000° C., no bubbles arose within the operational temperature range. Such extinction of bubbles is believed to be caused by phenomena that $N_2$ and $H_2$ present in the state of molecules are dispersed in the bulk of quartz glass or revive the original Si—N bonds again by the HIP treatment. The synthetic quartz glass thus obtained by heat-sintering was further improved in heat-resistance by a second HIP treatment. In a HIP treatment at a temperature of 1400° C. or lower, however, the effect of a pressure can reach only to the surface region due to excessively high viscosity of the synthetic quartz and thus the above-mentioned reaction does not occur. Upwards of 2000° C., sublimation of glass unfavorably arises. In a HIP treatment under a pressure of less than 500 kg/cm$^2$, the above-mentioned effect is not observed. On the other hand, a super-high pressure more than 2000 kg/cm$^2$ is not acceptable from an industrial view point due to high cost.

The invention will now be described by reference to examples. The measurements of physical characteristics in the examples are conducted in conformity with the following instructions.

(1) Heat-Resistance: to cut a glass body into strips and evaluate viscosity at 1280° C. by the beam-bending method.

(2) Nitrogen Concentration: to measure by the inert-gas fusion thermal conductivity method.

(3) Specific Gravity: to measure by an Archimedian method.

(4) Heat-Bubble Test: to heat and soften by an oxygen-hydrogen burner and observe generation of bubbles.

EXAMPLE 1

High-purity synthetic quartz glass with a density of 0.2 g/cm$^3$ and an overall variation of density of 10% produced in vapor phase by a VAD method, as shown in Table 1, was heat-treated at 1000° C. for 4 hours in an atmosphere composed of 50 volt of $NH_3$ and 50 vol% of $N_2$. In the obtained base material included was 0.3 wt% of nitrogen.

First, the above-mentioned nitrogen-doped synthetic quartz glass base material was heated-up to 1200° C. from room temperature at a rate of 10° C./min. under a reduced pressure of about 7 Pa. Secondly, it was further heated-up to 1600° C. from the 1200° C. at a rate of 2° C./min. Thirdly, it was kept at the last temperature for 2 hours. Finally, the heater was disconnected and the base material was left to be cooled to room temperature to be then taken out. The thus sintered synthetic quartz glass did not include any bubble and was dense at the same time.

The synthetic quartz glass was inserted in a HIP-treatment furnace planed in a carbon vessel, heated-up to 1600° C. from room temperature at a rate of 400° C./h in an argon atmosphere, and at the same time the pressure was increased to 1600 kg/cm$^2$ from 1 kg/cm$^2$ at a rate of 400 kg/cm$^2$ hr. Thereafter, the synthetic glass was held at the 1600° C. under the 1600 kg/cm$^2$ for 5 hours, in sequence the heating was stopped to cool down the synthesized-quartz glass to room temperature and the synthetic quartz glass was taken out. The synthetic quartz glass taken out included no bubble and was densified. Samples were prepared by cutting to measure the physical characteristics, which are shown in Table 1.

Comparative Example 1

Nitrogen-doped synthetic quartz glass was produced in a similar manner to that in Example 1 except that no HIP treatment was conducted. The synthetic quartz glass thus obtained had an appearance of being dense, but when the synthetic quartz glass was cut into strips to conduct a heat-bubble test, generation of bubbles was great. The physical characteristics of the synthetic quartz glass are also shown in Table 1.

Comparative Examples 2 and 3

Quartz glass porous bodies treated in an ammonia-containing atmosphere in a similar manner to that in Example 1 were first heated-up to 1600° C. from room temperature at a rate of 10° C./min. under a reduced pressure of about 7 Pa, then held at the temperature for 2 hours, and thereafter cooled down to room temperature by disconnecting a heater. No part of the thus obtained synthesized-quartz glass bodies was dense throughout the bulk and cloudiness remained in the inner bulk. A heat-bubble test was conducted on the synthetic quartz glass, which resulted in very many bubbles arising. The other of the nitrogen-doped synthetic quartz glass bodies was given a HIP treatment (Comparative Example 3). The synthetic quartz glass thus treated was further subjected to a heat-bubble test and generation of bubbles was observed. The physical characteristics were measured on the respective nitrogen-doped synthetic quartz glass bodies and they are shown in Table 1.

Comparative Examples 4 and 5

Synthetic quartz glass base material with an apparent density of 0.6 g/cm$^3$ and an overall density dispersion of 50% produced in vapor phase by a VAD method which uses a plurality of burners was treated in an ammonia-containing atmosphere in a similar manner to that in Example 1 and then sintered. No part of the nitrogen-doped synthetic quartz glasses thus obtained was dense throughout the bulk and included cloudy areas in the bulk. A heat-bubble test was conducted on the synthetic quartz glass and the result was generation of very many bubbles. A HIP treatment, as conducted in Example 1, was conducted on part of the nitrogen-doped synthetic quartz glass and bubbles were observed. The physical characteristics of the respective nitrogen-doped synthetic quartz glass samples were measured. The results are shown in Table 1.

Comparative Examples 6 and 7 synthetic quartz glass base material as shown in Table 1 with an apparent density of 0.6 g/cm$^3$ and an overall density dispersion of 50% produced in vapor phase by a VAD method which uses a plurality of burners was treated in an ammonia-containing atmosphere in a similar manner to that in Example 1, then heated-up to 1600° C. from room temperature at a rate of 10° C./min. under a reduced pressure of about 66 Pa, further held at the 1600° C. for 2 hours and lastly a heater was disconnected to cool the synthetic quartz glass to room temperature. No part of the nitrogen-doped synthetic quartz glass was dense throughout the bulk and cloudy areas were observed inside. A heat-bubble test was conducted on the nitrogen-doped synthetic quartz glass and generation of very many bubbles was observed. A HIP treatment as conducted in Example 1 was further conducted on part of the nitrogen-doped synthetic quartz glass as Comparative Example 7. The result was still generation of bubbles. The physical characteristics of the respective nitrogen-doped synthetic quartz glass samples were measured and are shown in Table 1.

TABLE 1

| | Viscosity 1280° C. (poise) | Specific Gravity (g/cm³) | N | Na | K | Li | Ca | Fe | Al | OH | After Sintering by Heating | Heat-Bubble Test |
|---|---|---|---|---|---|---|---|---|---|---|---|---|
| | | | | | | Metallic Impurities (ppm) | | | | | | |
| Example 1 | 12.5 | 2.22 | 3000 | <0.1 | <0.1 | <0.1 | <0.2 | <0.1 | <5 | 0 | Densified | No Bubble |
| Comparative Example 1 | 12.3 | 2.21 | 3000 | <0.1 | <0.1 | <0.1 | <0.2 | <0.1 | <5 | 0 | Densified | Very many Bubbles |
| Comparative Example 2 | 12.3 | 2.21 | 3000 | <0.1 | <0.1 | <0.1 | <0.2 | <0.1 | <5 | 0 | Cloudy | Very many Bubbles |
| Comparative Example 3 | 12.5 | 2.22 | 3000 | 0.1 | 0.1 | <0.1 | <0.2 | <0.1 | <5 | 0 | Cloudy | Bubbles |
| Comparative Example 4 | 12.3 | 2.21 | 3000 | <0.1 | <0.1 | <0.1 | <0.2 | <0.1 | <5 | 0 | Cloudy | Very many Bubbles |
| Comparative Example 5 | 12.5 | 2.22 | 3000 | 0.1 | 0.1 | <0.1 | <0.2 | <0.1 | <5 | 0 | Cloudy | Bubbles |
| Comparative Example 6 | 12.3 | 2.21 | 3000 | <0.1 | <0.1 | <0.1 | <0.2 | <0.1 | <5 | 0 | Cloudy | Very many Bubbles |
| Comparative Example 7 | 12.5 | 2.22 | 3000 | 0.1 | 0.1 | <0.1 | <0.2 | <0.1 | <5 | 0 | Cloudy | Bubbles |

As seen from the above table, quartz glass produced by a method according to the present invention has a high viscosity at a high temperature and is dense enough to be processed at a high temperature. On the other hand, quartz glasses in the comparative examples have cloudy areas in the bulk and generation of bubbles was observed at a temperature in the operational temperature range.

EFEECTS OF THE INVENTION

According to a method of the present invention, nitrogen-doped quartz glass with a high heat-resistance of 12.5 dpas or more at 1280° C. can be produced. In addition, since the raw material is produced by a vapor-synthesis method and is therefore a super-high-purity silica, the nitrogen-doped quartz glass according to the present invention cannot be a contamination source to semiconductor devices in use, even when it is used as structural members for semiconductor-device fabrication facilities.

We claim:

1. A method for producing heat resistant synthetic quartz glass, said method comprising the following serial steps:

heating a porous silica body in an ammonia-containing atmosphere, sintering said body by heating in a non-oxidizing atmosphere, and heating said body to a temperature of 1400° C. to 2000° C. under a pressure of 500 kg/cm² or more in a non-oxidizing atmosphere;

said sintering being conducted at a pressure of $1 \times 10^{-1}$ torr or less and a temperature of 1200° C. to 1700° C. so that the heating rate is regulated to be 200°/hour or less.

2. The method as in claim 1 wherein said porous silica body has a density prior to sintering of 0.1 g/cm³ and a density variation of less than 30%.

3. The method as in claim 1 wherein the heating rate is 2° C./min.

* * * * *

UNITED STATES PATENT AND TRADEMARK OFFICE
CERTIFICATE OF CORRECTION

PATENT NO. : 5, 766, 291
DATED : Jun. 16, 1998
INVENTOR(S) : Sato et al.

It is certified that error appears in the above-identified patent and that said Letters Patent is hereby corrected as shown below:

In column 3, line 44, change "volt" to -- vol% --.

In column 3, line 57, change "planed" to -- placed --.

Signed and Sealed this

Twentieth Day of June, 2000

Attest:

Q. TODD DICKINSON

Attesting Officer

Director of Patents and Trademarks